United States Patent [19]

Aspden et al.

[11] Patent Number: 4,849,159
[45] Date of Patent: Jul. 18, 1989

[54] COOLANT-PUMPING SYSTEM FOR A NUCLEAR REACTOR

[75] Inventors: Garth J. Aspden, Bolton; Graham Chesworth, Warrington, both of England

[73] Assignee: National Nuclear Corporation Limited, Knutsford, England

[21] Appl. No.: 30,983

[22] Filed: Mar. 27, 1987

[30] Foreign Application Priority Data

Apr. 14, 1986 [GB] United Kingdom ............... 8609068

[51] Int. Cl.⁴ ............................................. G21C 19/28
[52] U.S. Cl. .................................. 376/404; 376/286; 376/403
[58] Field of Search ................ 376/179, 286, 403, 404

[56] References Cited

U.S. PATENT DOCUMENTS

| | | | |
|---|---|---|---|
| 3,793,143 | 2/1974 | Muller | 376/403 |
| 3,937,653 | 2/1976 | Leheu | 376/404 |
| 4,219,385 | 8/1980 | Guidez et al. | 376/404 |
| 4,239,264 | 12/1980 | Evans | 376/286 |
| 4,613,478 | 9/1986 | Sharbaugh | 376/404 |

Primary Examiner—Deborah L. Kyle
Assistant Examiner—Richard W. Wendtland
Attorney, Agent, or Firm—William R. Hinds

[57] ABSTRACT

In a known design of liquid metal cooled fast fission nuclear reactor, the primary pumps (22) plug into the outboard ends of the high pressure pipes (28), leading to the development of a vertical load which has to be supported by substantial additional structure to avoid subjecting the reactor diagrid (18) to significant bending moments. The invention resides in connecting the inboard ends of the high pressure pipes (28) to the diagrid (18) via spigot and socket joints (40) so that the pipes are not rigidly connected at either end. With this arrangement loads are developed at each end of the pipes which combine to produce radial reaction loads acting on smaller moment arms whereby the total moments imposed on the diagrid are reduced.

7 Claims, 3 Drawing Sheets

COOLANT-PUMPING SYSTEM FOR A NUCLEAR REACTOR

This invention relates to coolant-pumping systems for nuclear reactors and is particularly concerned with a system for pumping liquid metal coolant through the reactor core of a pool-type liquid metal cooled fast breeder reactor.

In one design currently under consideration, the primary coolant circuit involves pumping liquid metal coolant drawn from the cold pool of the reactor through high pressure pipework connecting the pumps to side entry ports of a core inlet plenum incorporated in the diagrid disposed beneath the reactor core; the coolant then flows through the fuel sub-assemblies forming the core before discharging into hot pool of the reactor and returning to the cold pool via heat exchangers. The high pressure pipework in this arrangement is rigidly connected at one end to the side entry ports of the inlet plenum and extends upwardly and radially outwardly for engagement with the pump outlets via plug-in connections which are aligned axially with the pump axis and permit pump removal when necessary and also accommodate some degree of thermal expansion between the pumps and the high pressure pipework.

The use of side entry connections to the inlet port is advantageous when compared to previous designs in which the connections were made from beneath the inlet plenum because it is not necessary to accommodate any pipework beneath the diagrid allowing the use of a primary vessel which can be smaller heightwise.

However, side entry connections (as do bottom entry connections) suffer from the drawback that the high pressure feed of the coolant along the high pressure pipework develops a substantial vertical load at the connections, typically $10^6$ Newtons at full reactor power in the case of side entry connections. To avoid subjecting the diagrid to significant bending moments, it has previously been considered necessary to support the load by means of substantial supporting structure but this is undesirable from the standpoint of economic considerations and, in addition, space is at a premium within the reactor primary vessel.

The object of the present invention is to avoid the need for substantial and costly supporting structure for the high pressure pipework.

According to the present invention there is provided a nuclear reactor having a primary vessel, a fuel core supported on a diagrid within the primary vessel, said diagrid incorporating a core inlet plenum, and a liquid coolant-pumping system comprising at least one pump disposed within the primary vessel, the pump being operable to draw coolant from a hot zone of the reactor and having an outlet through which the coolant is delivered to the core inlet plenum via pipework connected between the pump outlet and an entry port of the diagrid, the diagrid entry port being formed by a laterally-projecting side entry nozzle disposed lower than the outlet of the pump, said pipework extending downwardly from the pump outlet to the side entry nozzle, said pipework being connected at its upper end to the pump outlet via a first non-rigid connection and at its lower end to the side entry nozzle via a second non-rigid connection which is offset with respect to the pump axis in a direction toward the diagrid, each non-rigid connection comprising a sliding spigot and socket joint.

Also according to the invention, there is provided a nuclear reactor having a primary vessel, a fuel core supported on a diagrid within the primary vessel, said diagrid incorporating a core inlet plenum, and a liquid coolant-pumping system comprising at least one pump disposed within the primary vessel, the pump being operable to draw coolant from a hot zone of the reactor and having an outlet through which the coolant is delivered to the core inlet plenum via pipework connected between the pump outlet and an entry port of the diagrid, the diagrid entry port being formed by a laterally-projecting side entry nozzle disposed lower than the outlet of the pump, said pipework extending downwardly from the pump outlet to the side entry nozzle, said pipework being connected at its upper end to the pump outlet via a first non-rigid connection and at its lower end to the side entry nozzle via a second non-rigid connection which is offset with respect to the pump axis in a direction toward the diagrid, said pipework extending continuously downwardly from the first connection to the second connection.

Still further in accordance with the invention, there is provided a nuclear reactor having a coolant-containing primary vessel, a fuel core supported on a diagrid within said primary vessel, said diagrid incorporating a core inlet plenum, and a liquid coolant-pumping system comprising at least one pump located in said primary vessel in laterally spaced relation to the core, said pump being operable to draw coolant from a hot zone of the reactor and having an outlet through which the coolant is delivered to the core inlet plenum via pipework connected between the pump outlet and an entry port of the diagrid, the pump outlet being disposed at a higher level than the diagrid entry port and being laterally offset therefrom in a direction away from the core, the diagrid entry port comprising a side entry nozzle which is rigidly connected to the diagrid so as to extend laterally from a side wall of the diagrid, said side entry nozzle terminating in an upwardly and laterally directed socket in which a lower end of the pipework is received in the manner of a spigot to form a first sliding spigot and socket joint, the pipework extending upwardly and laterally outwardly from said side entry nozzle and terminating at the upper end thereof in a socket into which the pump outlet extends in the manner of a spigot to form a second sliding spigot and socket joint, at least said first spigot and socket joint being offset with respect to the pump in a direction toward the diagrid.

In one embodiment, the non-rigid connection between the upper end of the pipework and the pump outlet may be offset with respect to the axis of the main body of the pump in a direction toward the diagrid. In another embodiment, the non-rigid connection between the upper end of the pipework and the pump outlet may be aligned axially with the axis of the main body of the pump. The pump may have a main body having a generally vertical axis and in which the pump outlet and, hence, the second sliding spigot and socket joint, referred to in the preceding paragraph, may be horizontally offset from the main body axis in a direction toward the diagrid.

To promote further understanding of the invention, embodiments will now be described by way of example only with reference to the accompanying drawings, in which.

Figure 1:
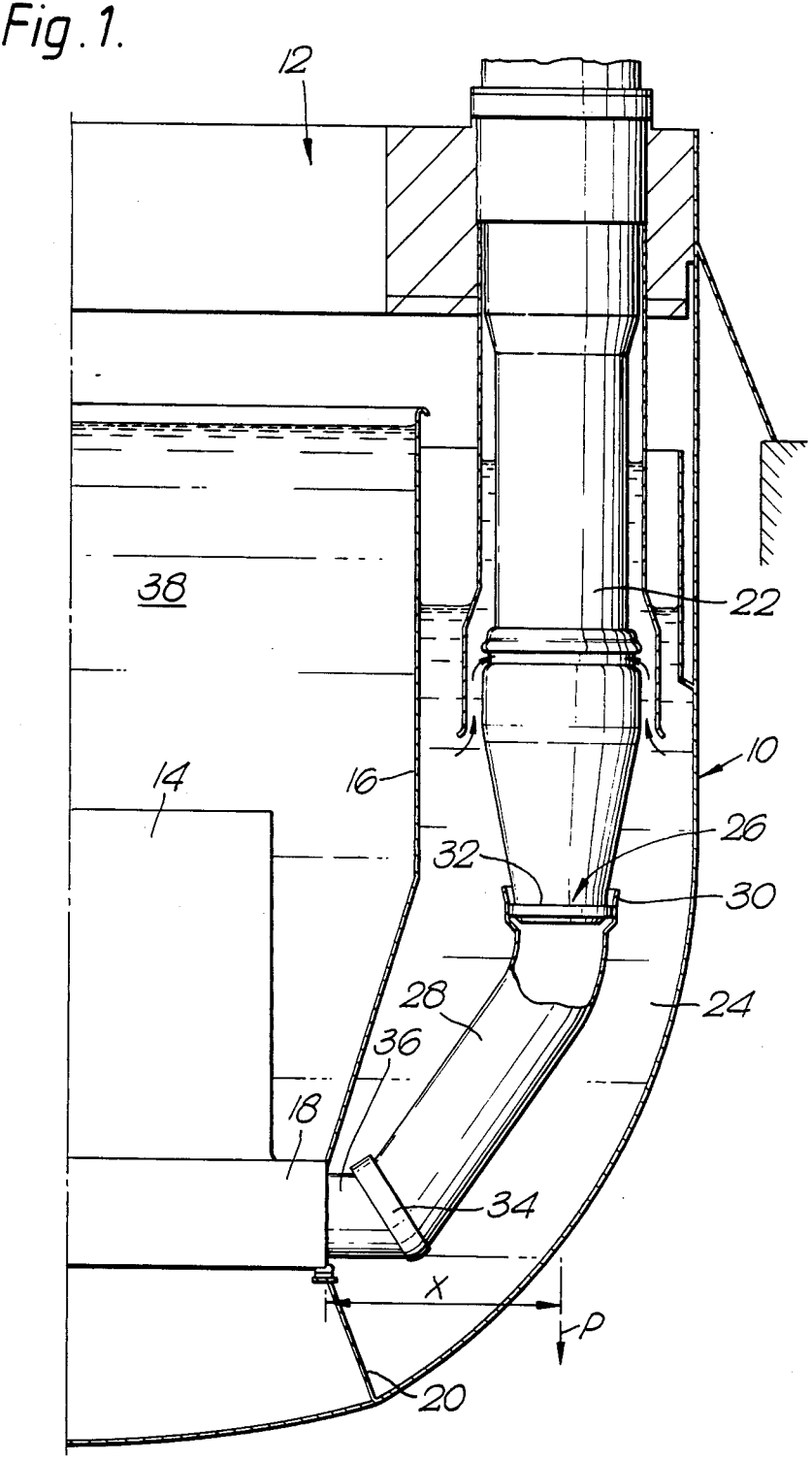
FIG. 1 is a diagrammatic sectional view to one side of the centre line of a reactor primary vessel, this embodiment representing a design which does not embody the inventive concept.

Referring to FIG. 1, the design illustrated relates to a liquid sodium-cooled fast breeder reactor having a primary vessel 10 surmounted by roof structure 12 and incorporating a fuel core 14 enclosed within an inner tank 16. The core 14 is itself mounted on a diagrid structure 18 and support skirt 20. Coolant flow through the reactor core 14 is effected by a number of pumps 22 (usually four, only one of which is shown) suspended from the roof structure 12 and immersed in the cold pool 24. The pump outlet 26 is connected to the upper end of high pressure pipe 28 via an articulated joint 30 comprising a spigot and socket type connection with piston ring-type seals 32. the high pressure pipe has its lower end rigidly united with an internally vaned cascade section 34 which aids deflection of coolant flow around the bend junction between pipe 28 and a side entry nozzle 36 of the diagrid 18. The diagrid 18 incorporates a core inlet plenum into which the coolant flows via the side entry nozzles 36 before flowing upwardly through an array of fuel and breeder sub-assemblies forming the core 14. The coolant discharges from the core 14 into the hot pool 38 and is returned to the cold pool 24 via primary circuit heat exchangers (not shown).

In this embodiment, because the high pressure pipes 28 are not rigidly connected to the outlets of the pumps 22, a vertical load is developed at the connections of nozzles 36 to the diagrid 18 and the latter, in the absence of any support, would be subjected to a bending moment of P multiplied by x. In practice, P may be of the order of 100 tonnes and x may be 3.2 meters, giving a bending moment of 320 Te-m. In previous proposals, to avoid bending moments of this magnitude, substantial support structure (not shown) has been incorporated to support the vertical load developed by the pumps.

Figure 2:
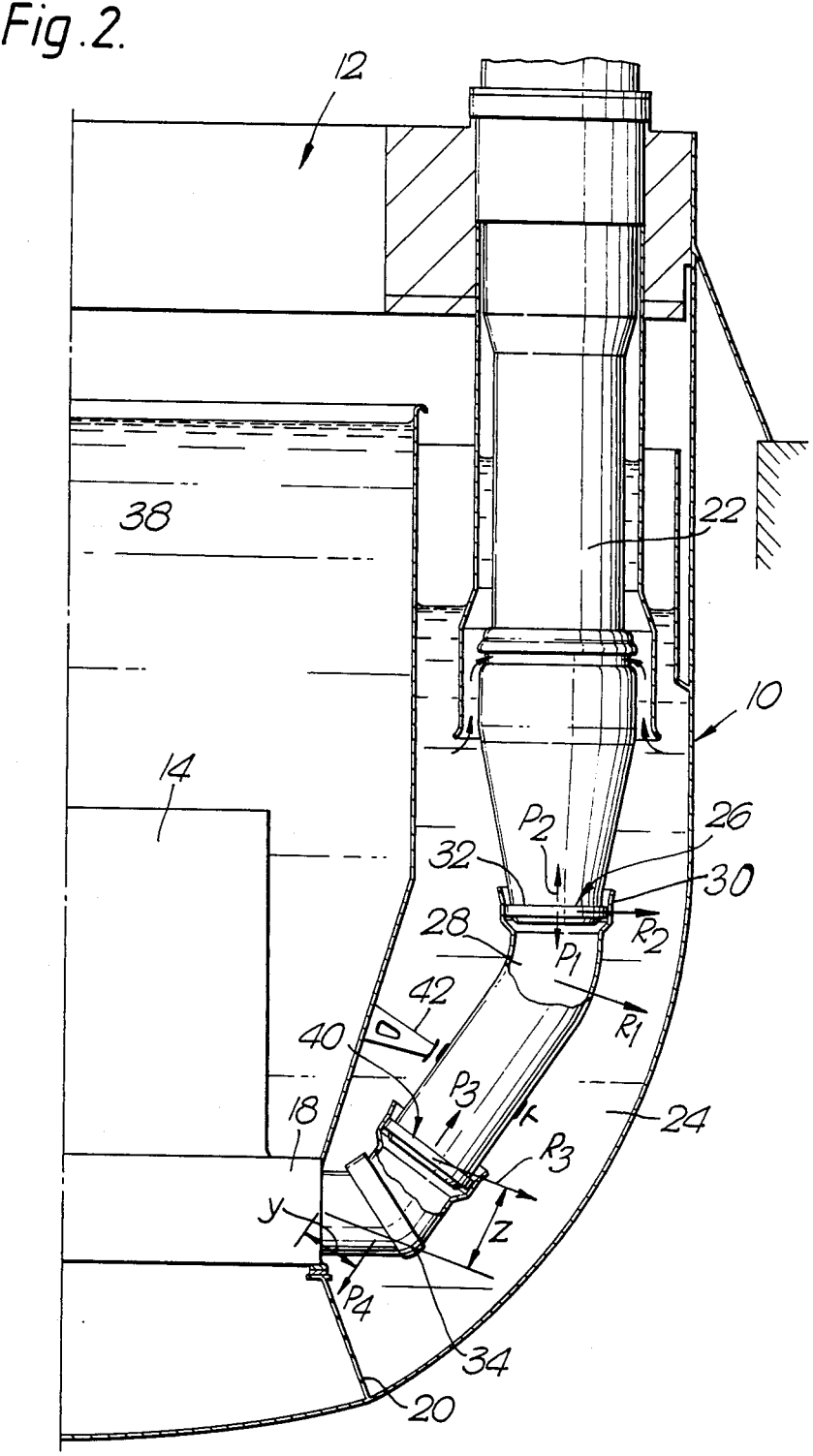
FIG. 2 is a view similar to FIG. 1 but showing the application of the inventive concept.

FIG. 2 illustrates the approach upon which the invention is based, the same reference numerals being used to depict components which are common to FIGS. 1 and 2. In FIG. 2, the high pressure pipe 28 at its lower end is connected to the diagrid nozzle 36 and cascade 34 via a second articulated joint 40 similar to the joint 26 and the pipe 28 is located by an arm 42 which may be attached to the inner tank 16 and embrace the pipe 28 so as to allow some degree of floating movement of the pipe 28. In this arrangement loads are developed at each seal connection 26, 40 and the pipe is subjected to downward vertical and inclined upward loadings of similar magnitude (see vectors P1, P2, P3 and P4 - typically of the order of 100 tonnes). These combine to produce reduced reaction loads R1, R2, R3 and the radial reaction loads R2, R3 at the joints 26, 40 may, in the example previously mentioned of a vertical downwards load of 100 tonnes, be of the order of 45 and 15 tonnes respectively. The loads P4 and R3 are primarily responsible for the application of bending moments to the diagrid and act on moment arms y and z, which distances are typically of the order of 0.9 meters and 1.2 meters respectively. Thus, the total bending moment resulting from these loads is typically of the order of $(100 \times 0.9 + 15 \times 1.2 =)$ 108 Te-m.

Figure 3:
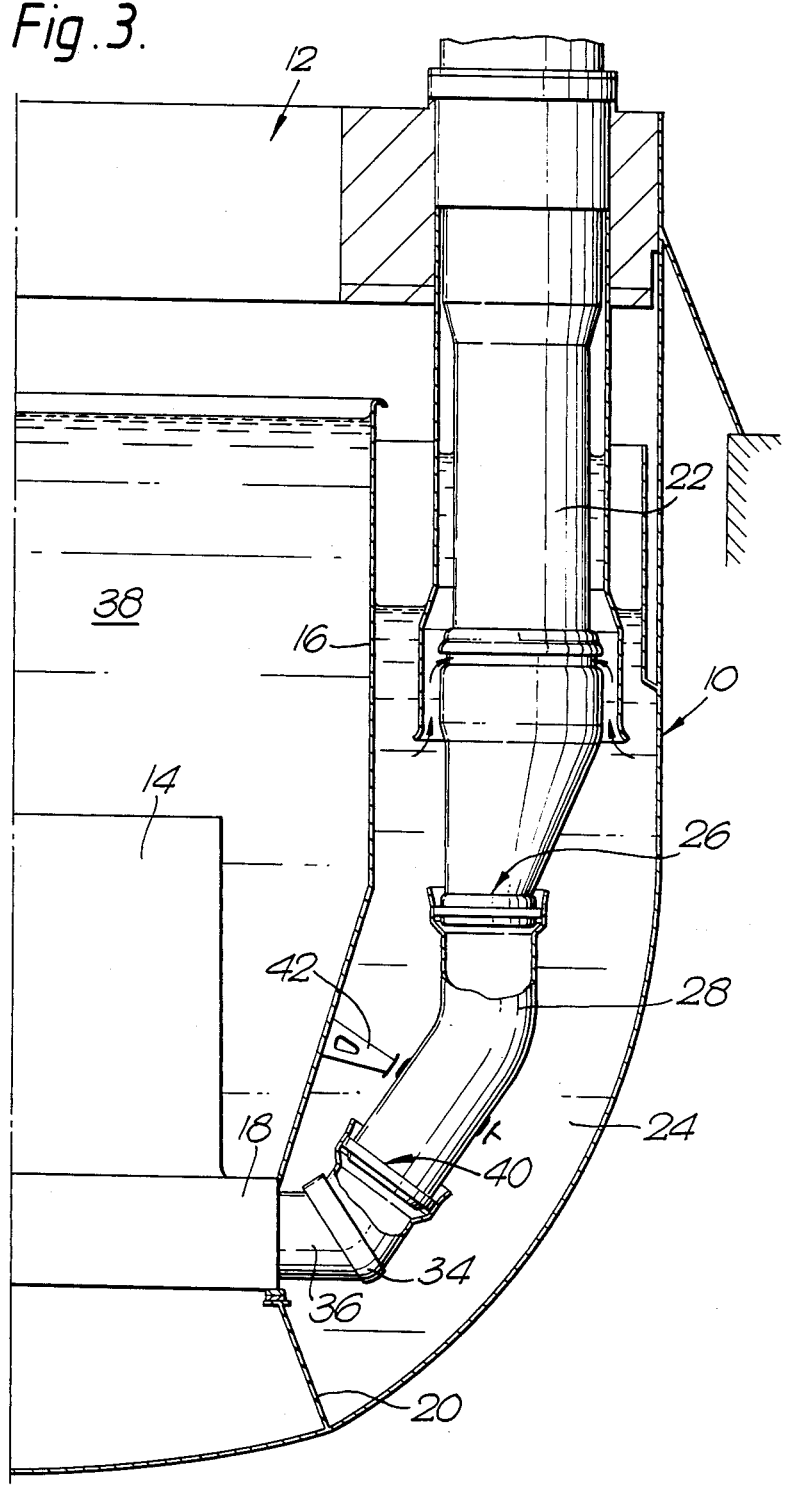
FIG. 3 is a view of a further modification also in accordance with the invention.

It will be seen that, with the arrangement of FIG. 2, the actual loadings are dependent on the angle and length of the pipe 28. The loads specified above can be reduced further by offsetting the pump outlet radially towards the diagrid centre line - this modification is shown in FIG. 3. In addition to reducing the bending moment on the diagrid, arrangements incorporating a "loose" pipe serve, by movement of the pipe, to accommodate radial and vertical expansion differentials which exist between the pump location in the roof structure and the diagrid.

We claim:

1. A nuclear reactor having a coolant-containing primary vessel, a fuel core supported on a diagrid within said primary vessel, said diagrid incorporating a core inlet plenum, and a liquid coolant-pumping system comprising at least one pump located in said primary vessel in laterally spaced relation to the core, said pump being operable to draw coolant from a hot zone of the reactor and having an outlet through which the coolant is delivered to the core inlet plenum via pipework connected between the pump outlet and an entry port of the diagrid, the pump outlet being disposed at a higher level that the diagrid entry port and being laterally offset therefrom in a direction away from the core, the diagrid entry port comprising a side entry nozzle which is rigidly connected to the diagrid so as to extend laterally from a side wall of the diagrid, said side entry nozzle terminating in an upwardly and laterally directed socket in which a lower end of the pipework is received in the manner of a spigot to form a first sliding spigot and socket joint, the pipework extending upwardly and laterally outwardly from said side entry nozzle and terminating at the upper end thereof in a socket into which the pump outlet extends in the manner of a spigot to form a second sliding spigot and socket joint, at least said first spigot and socket joint being offset with respect to the pump in a direction toward the diagrid.

2. A reactor as claimed in claim 1 in which the pump has a main body having a generally vertical axis and in which the pump outlet, and hence said second sliding spigot and socket joint, is horizontally offset from the main body axis in a direction toward the diagrid.

3. A reactor as claimed in claim 1 wherein said pipework extends continuously downwardly from said second joint to said first joint.

4. A nuclear reactor having a primary vessel, a fuel core supported on a diagrid within the primary vessel, said diagrid incorporating a core inlet plenum, and a liquid coolant-pumping system comprising at least one pump disposed within the primary vessel, the pump being operable to draw coolant from a hot zone of the reactor and having an outlet through which the coolant is delivered to the core inlet plenum via pipework connected between the pump outlet and an entry port of the diagrid, the diagrid entry port being formed by a laterally-projecting side entry nozzle disposed lower than the outlet of the pump, said pipework extending downwardly from the pump outlet to the side entry nozzle, said pipework being connected at its upper end to the pump outlet via a first non-rigid connection and at its lower end to the side entry nozzle via a second non-rigid connection which is offset with respect to the pump axis in a direction toward the diagrid wherein each non-rigid connection comprises a sliding spigot and socket joint.

5. A reactor as claimed in claim 4 in which the non-rigid connection between the upper end of said pipework and the pump outlet is offset with respect to the axis of the main body of the pump in a direction toward the diagrid.

6. A reactor as claimed in claim 4 in which the non-rigid connection between the upper end of said pipework and the pump outlet is aligned axially with the axis of the main body of the pump.

7. A nuclear reactor having a primary vessel, a fuel core supported on a diagrid within the primary vessel, said diagrid incorporating a core inlet plenum, and a liquid coolant-pumping system comprising at least one pump disposed within the primary vessel, the pump being operable to draw coolant from a hot zone of the reactor and having an outlet through which the coolant is delivered to the core inlet plenum via pipework connected between the pump outlet and an entry port of the diagrid, the diagrid entry port being formed by a laterally-projecting side entry nozzle disposed lower than the outlet of the pump, said pipework extending downwardly from the pump outlet to the side entry nozzle, said pipework being connected at its upper end to the pump outlet via a first non-rigid connection and at its lower end to the side entry nozzle via a second non-rigid connection which is offset with respect to the pump axis in a direction toward the diagrid wherein said pipework extends continuously downwardly from said first connection to said second connection.

* * * * *